US009507212B2

(12) United States Patent
Huang

(10) Patent No.: US 9,507,212 B2
(45) Date of Patent: Nov. 29, 2016

(54) PHOTOALIGNMENT EQUIPMENT AND PHOTOALIGNMENT METHOD

(71) Applicant: AU Optronics Corporation, Hsin-Chu (TW)

(72) Inventor: Chin-Wen Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/053,583

(22) Filed: Feb. 25, 2016

(65) Prior Publication Data

US 2016/0178970 A1 Jun. 23, 2016

Related U.S. Application Data

(62) Division of application No. 14/277,105, filed on May 14, 2014, now Pat. No. 9,304,357.

(30) Foreign Application Priority Data

Nov. 5, 2013 (TW) .............................. 102140119 A

(51) Int. Cl.
*G02F 1/1337* (2006.01)
*G02F 1/13* (2006.01)
*G02B 5/20* (2006.01)

(52) U.S. Cl.
CPC ......... *G02F 1/133788* (2013.01); *G02B 5/208* (2013.01); *G02F 1/1303* (2013.01)

(58) Field of Classification Search
CPC G02F 1/133788; G02F 1/1303; G02B 5/208
See application file for complete search history.

(56) References Cited

U.S. PATENT DOCUMENTS

| 5,998,766 A * | 12/1999 | Mizosaki | ................... G03F 7/16 219/390 |
| 2002/0145711 A1 | 10/2002 | Magome et al. | |
| 2003/0108665 A1 * | 6/2003 | Biro | ....................... C03C 17/001 427/162 |
| 2011/0299000 A1 * | 12/2011 | Woodgate | ............ G02B 5/0215 349/15 |

FOREIGN PATENT DOCUMENTS

TW M447388 2/2013

* cited by examiner

*Primary Examiner* — Nathanael R Briggs
(74) *Attorney, Agent, or Firm* — WPAT, PC; Justin King

(57) ABSTRACT

A photoalignment equipment includes a light emitting device, a platform, a pipe assembly, and a blower. The light emitting device has an ultraviolet light source and an accommodating space. The ultraviolet light source is located in the accommodating space. When the ultraviolet light source emits an ultraviolet light, at least a portion of air in the accommodating space is transformed into a plurality of ozone molecules. The platform is under the light-emitting device. The pipe assembly has a first opening and at least one second opening. The first opening is communicated with the accommodating space, and the second opening faces the platform. The blower is communicated with the pipe assembly to draw the ozone molecules in the accommodating space by the first opening of the pipe assembly and exhausts the ozone molecules from the second opening of the pipe assembly.

5 Claims, 8 Drawing Sheets

PHOTOALIGNMENT EQUIPMENT AND PHOTOALIGNMENT METHOD

RELATED APPLICATIONS

The present application is a Divisional Application of the application Ser. No. 14/277,105, filed May 14, 2014, which claims priority to Taiwan Application Serial Number 102140119, filed Nov. 5, 2013, all of which are herein incorporated by reference.

BACKGROUND

Technical Field

The present disclosure relates to a photoalignment equipment and a photoalignment method.

Description of Related Art

Liquid crystal alignment processes for liquid crystal display panels include rubbing alignment method, photoalignment method, evaporation method, ion beam alignment method, nano-alignment method, etc., of which, the rubbing alignment method has been extensively applied in the industry. In the rubbing alignment method, rollers having fabric are used to rub on the surface of an alignment film, such that the alignment film is structurally orientated in the same direction. However, upon the rollers rubbing the alignment film, residual dust particles and static electricity are apt to be found in the alignment film, which affects the yield rate of panel products.

In the photoalignment method, a polarized ultraviolet light is utilized to emit to the alignment material formed on a substrate, such that the alignment material has optical anisotropy. Since the rollers rubbing on the alignment film are not required in the photoalignment method, the photoalignment method can improve the yield rate of the products and the stability of production equipments. In recent years, the photoalignment method has been performed on in-plane switching (IPS) panels. The conventional photoalignment method utilizes the ultraviolet light to emit to the alignment material on the substrate. Besides, a heating equipment and an oxygen providing equipment may be used to accelerate the reaction rate of the alignment material. However, the heating equipment and the oxygen providing equipment incur additional expense, and increase the power consumption of the photoalignment method, which hinders the reduction in the manufacturing cost of the display panels.

SUMMARY

An aspect of the present disclosure is to provide a photoalignment equipment.

According to an embodiment of the present invention, a photoalignment equipment includes a light emitting device, a platform, a pipe assembly, and a blower. The light emitting device has an ultraviolet light source and an accommodating space. The ultraviolet light source is located in the accommodating space. When the ultraviolet light source emits an ultraviolet light, at least a portion of air in the accommodating space is transformed into a plurality of ozone molecules. The platform is under the light-emitting device. The pipe assembly has a first opening and at least one second opening. The first opening is communicated with the accommodating space, and the second opening faces the platform. The blower is communicated with the pipe assembly to draw the ozone molecules in the accommodating space by the first opening of the pipe assembly and exhausts the ozone molecules from the second opening of the pipe assembly.

In the aforementioned embodiments of the present invention, when the ultraviolet light source emits the ultraviolet light, the air in the accommodating space may be transformed into the high temperature ozone molecules. Therefore, the blower can draw the ozone molecules in the accommodating space by the first opening of the pipe assembly, and exhausts the ozone molecules from the second opening of the pipe assembly. As a result, when the platform supports a substrate covered by an alignment film material, the substrate can be in contact with the ozone molecules exhausted by the second opening of the pipe assembly during UV exposure, such that the orientation of the alignment film material may be improved.

Another aspect of the present invention is to provide a photoalignment equipment.

According to an embodiment of the present invention, a photoalignment equipment includes an ultraviolet light source, a platform, an optical filter, and a pipe assembly. The ultraviolet light source has a first wave band and a second wave band. The platform is under the ultraviolet light source. The optical filter is located between the ultraviolet light source and the platform. A first accommodating space and a second accommodating space are divided by the optical filter. The ultraviolet light source is disposed in the first accommodating space. The platform is disposed in the second accommodating space. The first wave band does not pass through the optical filter, while the second wave band passes through the optical filter. The pipe assembly is communicated with the first and second accommodating spaces.

Another aspect of the present invention is to provide a photoalignment method.

According to an embodiment of the present invention, a photoalignment method includes the following steps. A substrate covered by an alignment film material on a platform is provided. An ultraviolet light source is utilized to emit an ultraviolet light to the alignment film material. A first wave band of the ultraviolet light source is utilized to transform a portion of air into a plurality of ozone molecules. The ozone molecules are recycled to transmit to the substrate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
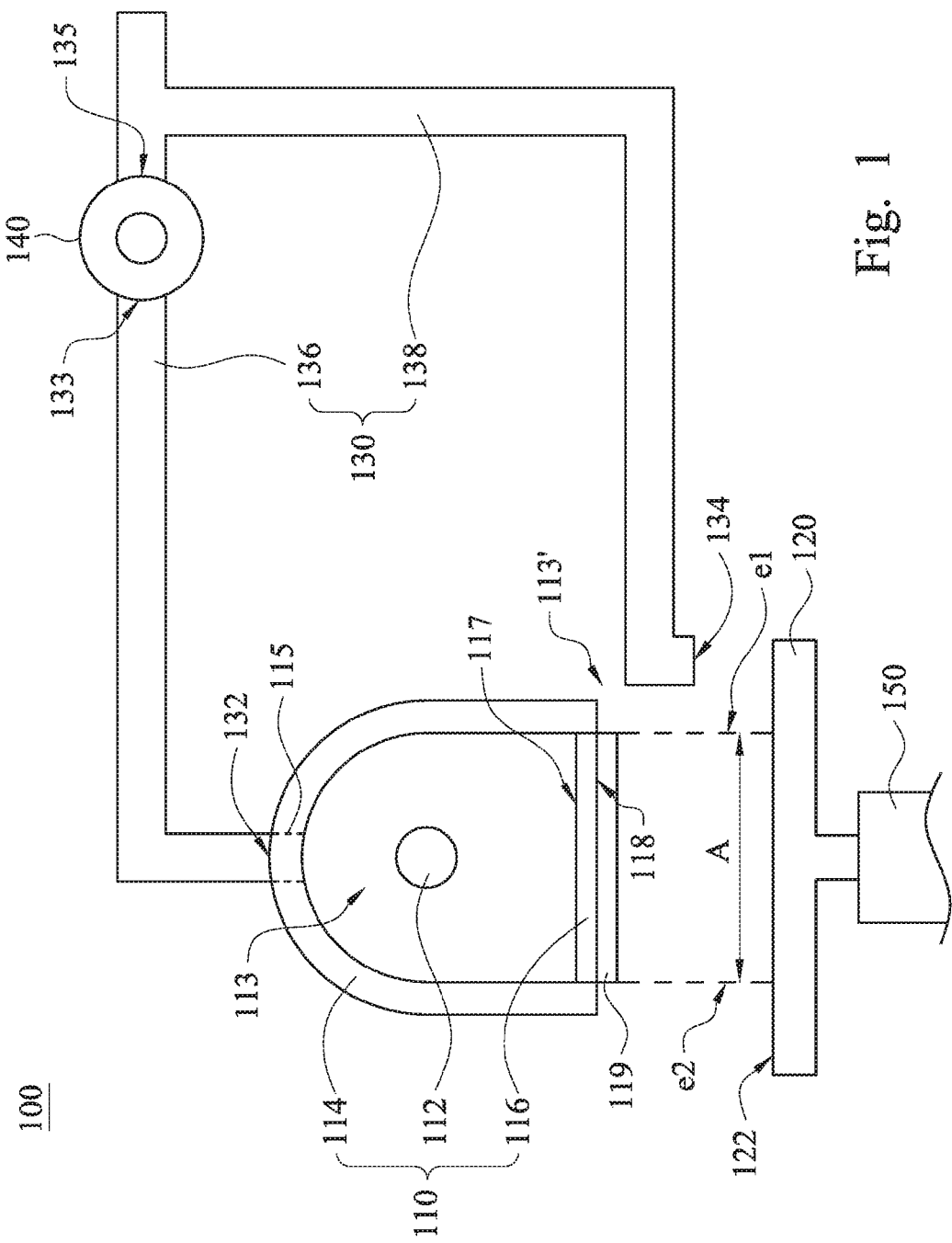
FIG. 1 is a schematic view of a photoalignment equipment according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a photoalignment equipment 100 according to an embodiment of the present invention. As shown in FIG. 1, the photoalignment equipment 100 includes a light emitting device 110, a platform 120, a pipe assembly 130, and a blower 140. The light emitting device 110 has an ultraviolet light source 112 and a first accommodating space 113. The ultraviolet light source 112 is located in the first accommodating space 113. The platform 120 is under the light-emitting device 110. The pipe assembly 130 has a first opening 132 and a second opening 134. The first opening 132 is communicated with the first accommodating space 113, and the second opening 134 faces the platform 120. The blower 140 is communicated with the pipe assembly 130.

When the ultraviolet light source 112 emits an ultraviolet light, at least a portion of air in the first accommodating space 113 is transformed into a plurality of ozone molecules. The blower 140 can draw the ozone molecules in the first accommodating space 113 by the first opening 132 of the pipe assembly 130, and the blower 140 exhausts the ozone molecules from the second opening 134 of the pipe assembly 130.

In this embodiment, the light emitting device 110 includes a housing 114 and an optical filter 116. The housing 114 has a channel 115, and two ends of the channel 115 are respectively communicated with the first accommodating space 113 and the first opening 132 of the pipe assembly 130. The optical filter 116 is located on the housing 114, and the first accommodating space 113 is defined by the optical filter 116 and the housing 114. The optical filter 116 is located between the ultraviolet light source 112 and the platform 120, and the first accommodating space 113 and a second accommodating space 113' are divided by the optical filter 116. The second accommodating space 113' may be referred to as a space out of the light emitting device 110. The optical filter 116 has a light incident surface 117 and a light emitting surface 118 opposite to the light incident surface 117. The light incident surface 117 faces the ultraviolet light source 112, and the light emitting surface 118 faces at least a portion of the platform 120. The optical filter 116 can be used to filter light with a wave band smaller than or equal to 240 nm, such as in a range from 200 nm to 240 nm. The material of the optical filter 116 may be, but not limited to glass. In this embodiment, when a light emit to the optical filter 116, only the light with a wave band greater than 240 nm can pass through the optical filter 116. In another embodiment, the optical filter 116 is a band pass filter to allow a wave band passing through. For example, a wave band in a range from 240 to 300 nm or 240 to 350 nm passes through the optical filter 116.

Figure 3:
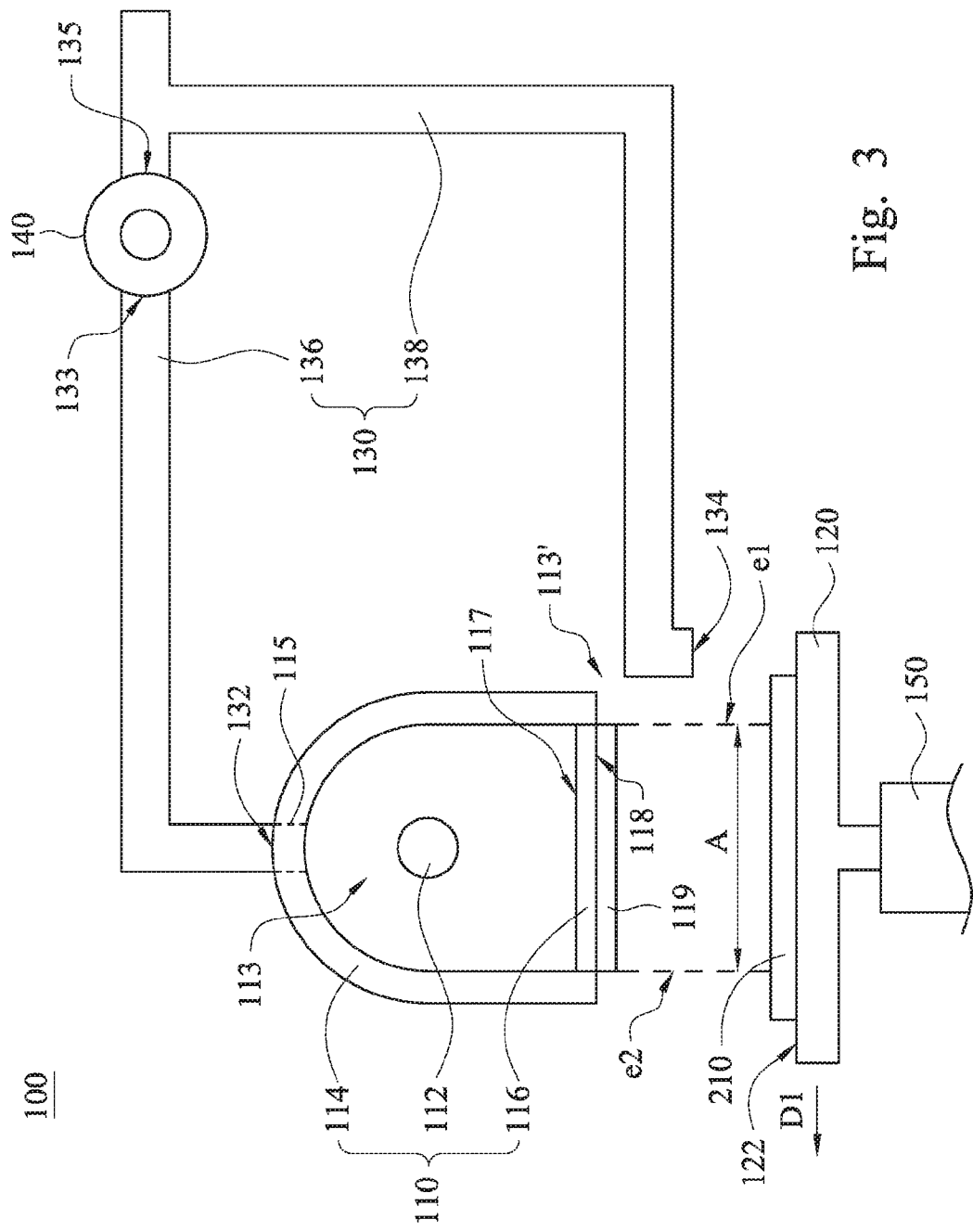
FIG. 3 is a schematic view of the photoalignment equipment shown in FIG. 2 when the photoalignment equipment is in operation and the substrate is in the exposure zone.

Moreover, the photoalignment equipment 100 may further include a polarization sheet 119. The polarization sheet 119 is located between the light emitting device 110 and the platform 120. As shown in FIG. 3, the polarization sheet 119 is located on the light emitting surface 118 of the optical filter 116 facing away from the first accommodating space 113, such that the polarization sheet 119 is located between the optical filter 116 and the platform 120. When a light passes through the optical filter 116 and the polarization sheet 119, the light forms a polarized light to emit to a substrate 210 (see FIG. 3), such that the alignment film material covered on the substrate 210 can be orientated. In this embodiment, the polarization sheet 119 is disposed the outside of the first accommodation 113 to be not in contact with the ozone molecules and a wave band of the light is smaller than 240 nm, thereby extending the life span of the polarization sheet 119. However, the present invention in not limited in this regard. In another embodiment, the polarization sheet 119 is disposed above the optical filter 116, such that the polarization sheet 119 is located between the light emitting device 110 and the optical filter 116. That is the polarization sheet 119 is disposed the inside of the accommodation 113.

The platform 120 is disposed in the second accommodating space 113'. When the ultraviolet light source 112 emits the ultraviolet light, the ultraviolet light forms an exposure zone A on the plane 122 of the platform 120, and two opposite sides of the exposure zone A are respectively defined to be an inlet side e1 and an outlet side e2. The second opening 134 of the pipe assembly 130 is at the inlet side e1. In this embodiment, the photoalignment equipment further includes a moving device 150, such that the platform 120 moves in (along) a horizontal direction under the light emitting device 110 by the moving device 150.

In this embodiment, the pipe assembly 130 includes a first pipe 136 and a second pipe 138. Two ends of the first pipe 136 respectively have a first opening 132 and a third opening 133, and the third opening 133 is communicated with the gas inlet of the blower 140. Two ends of the second pipe 138 respectively have a second opening 134 and a fourth opening 135, and the fourth opening 135 is communicated with the gas outlet of the blower 140. However, the number of the pipes and the pipe design of the pipe assembly 130 are not limited in the present invention, and as long as the pipe assembly 130 can be communicated with the first and second accommodating spaces 113, 113'.

In the following description, the operation state of the photoalignment equipment 100 will be described in detail.

Figure 2:
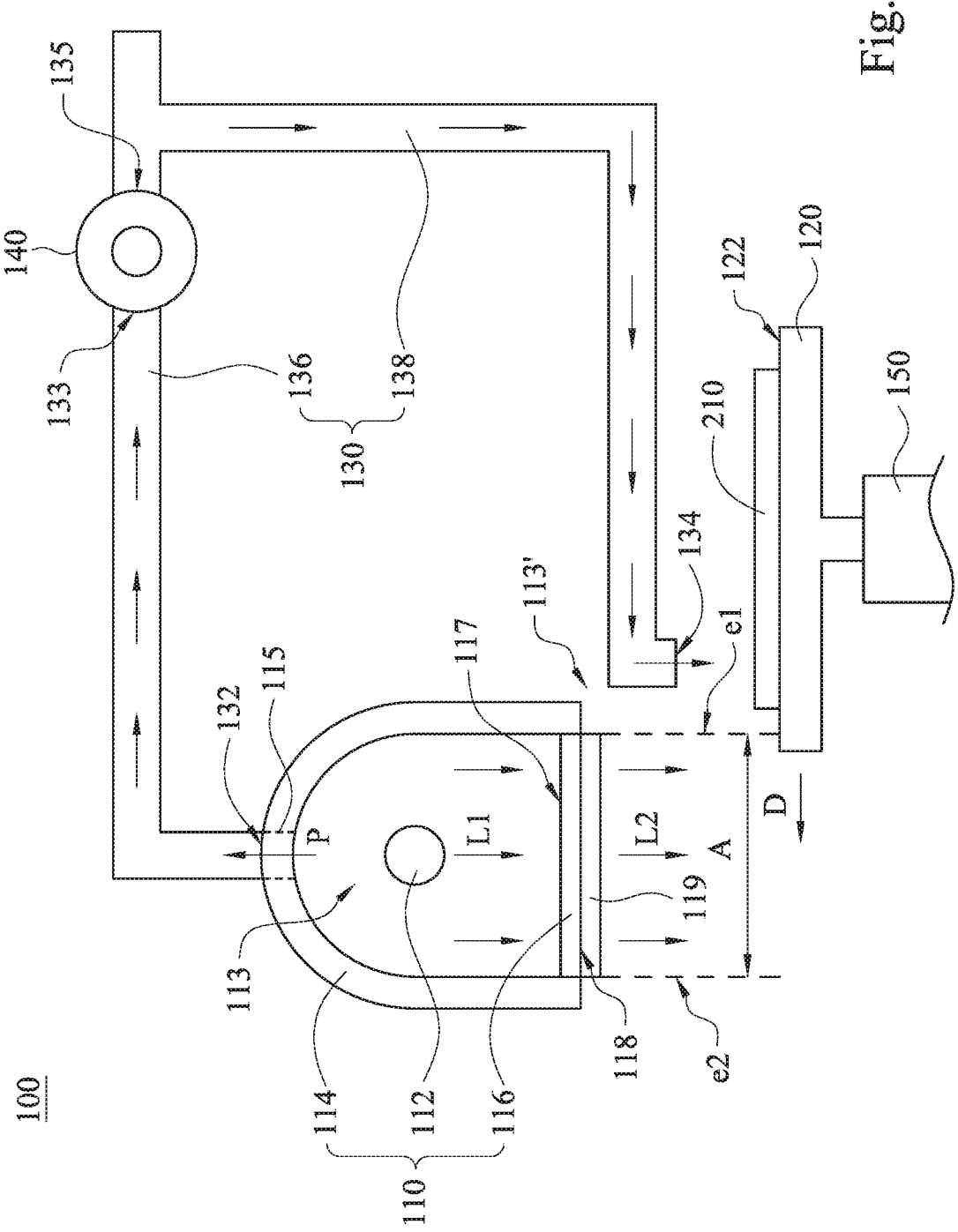
FIG. 2 is a schematic view of the photoalignment equipment shown in FIG. 1 when the photoalignment equipment is in operation and a substrate does not move into an exposure zone.

FIG. 2 is a schematic view of the photoalignment equipment 100 shown in FIG. 1 when the photoalignment equipment 100 is in operation and the substrate 210 does not move into the exposure zone A. The substrate 210 covered by the alignment film material is on the platform 120. The ultraviolet light source 112 has a first wave band and a second wave band. The first wave band is smaller or equal to 240 nm, and the second wave band is greater than 240 nm. The ultraviolet light source 112 can emit an ultraviolet light L1 with the first and second wave bands. When the ultraviolet light L1 passes through the optical filter 116, the ultraviolet light with the first wave band cannot pass through the optical filter 116 and is left in the first accommodating spaces 113, such that the air adjacent to the ultraviolet light source 112 (i.e., a portion of the air in the first accommodating space 113) is transformed into the ozone molecules due to the ultraviolet light with the first wave band. Moreover, the ultraviolet light L2 with the second wave band can pass through the optical filter 116. When the ultraviolet light source 112 is in operation, the ozone molecules are heated by the ultraviolet light source 112, such that the temperature of the ozone molecules substantially is in a range from 40 to 60° C.

The blower 140 can draw the ozone molecules in the first accommodating space 113 by the first opening 132 of the pipe assembly 130, and exhausts the ozone molecules from the second opening 134 of the pipe assembly 130, such that the ozone molecules can be recycled to transmit to the substrate 210 on the platform 120. That is to say, the ozone molecules move along a path P. As a result, the substrate 210 is in contact with the high temperature ozone molecules exhausted by the second opening 134 of the pipe assembly 130, and the substrate 210 can be preheated and in a ozone condition before the substrate 210 is exposed to the ultraviolet light L2.

When the moving device 150 moves in a direction D, the substrate 210 is moved into the exposure zone A in the direction D from the inlet side e1 by the platform 120. Before the surface of the substrate 210 is moved into the exposure zone A, the substrate 210 has been passed under the second opening 134 to be preheated and in contact with the ozone molecules. That is to say, the photoalignment equipment 100 can recycle the hot air and the ozone molecules generated by the ultraviolet light source 112 to transmit to the substrate 210.

FIG. 3 is a schematic view of the photoalignment equipment 100 shown in FIG. 2 when the photoalignment equipment 100 is in operation and the substrate 210 is in the exposure zone A. As shown in FIG. 2 and FIG. 3, when the substrate 210 moves into the exposure zone A from the inlet side e1 and is exposed to the ultraviolet light L2, at least a portion of an orthographic projection of the optical filter 116 on the platform 120 overlaps at least a portion of an orthographic projection of the substrate 210 on the platform 120, such that the alignment film material on the substrate 210 can be scanned by the ultraviolet light L2 with the second wave band. At this moment, the air with the high temperature ozone molecules flows into the exposure zone A from the second opening 134. Since the substrate 210 has been preheated and in a ozone condition, when the alignment film material on the substrate 210 is exposed to the ultraviolet light L2, the reaction rate and the orientation of the alignment film material are improved. Thereafter, the moving device 150 may move out the platform 120 from the outlet side e2 of the exposure zone A, but the present invention is not limited in this regard.

When the substrate 210 is during the aforesaid UV exposure, the substrate 210 is exposed to the air with the high temperature ozone molecules at the same time. The photoalignment equipment 100 does not need additional heating equipment and oxygen providing equipment, and the reaction rate and the orientation of the alignment film material still can be improved. Therefore, the costs of equipments and electric power are reduced.

Figure 4:
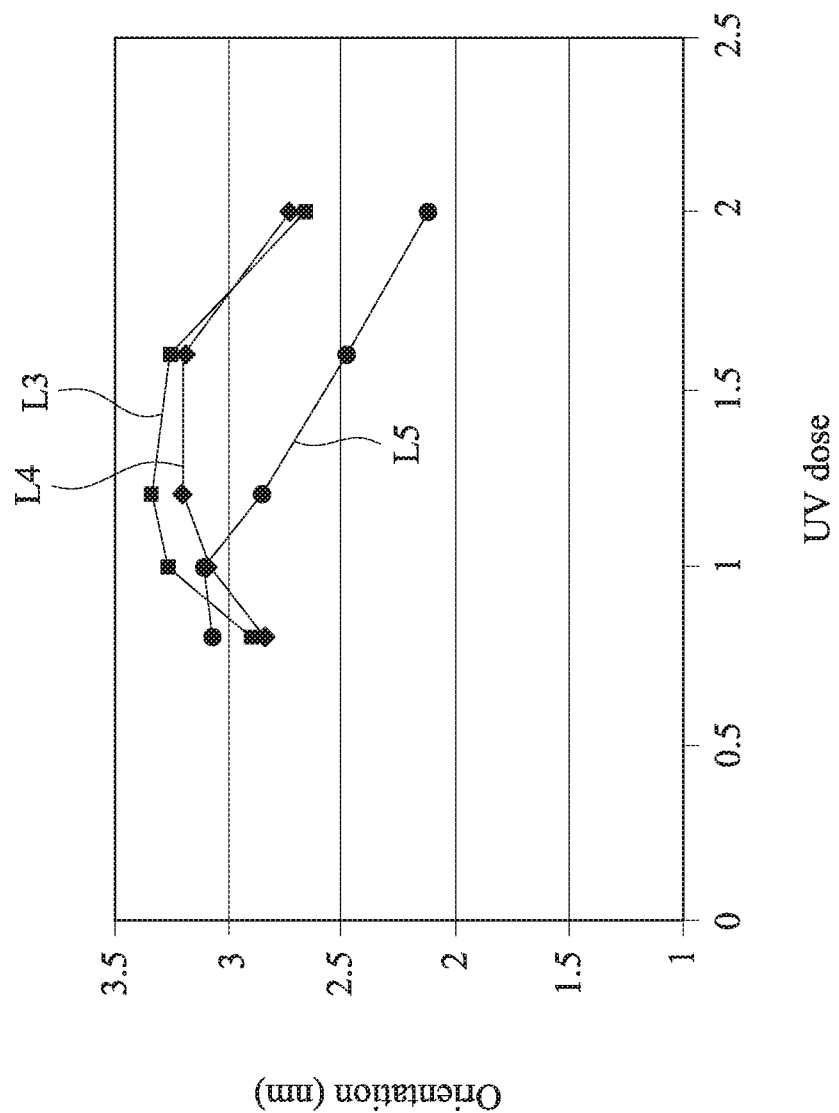
FIG. 4 is an orientation-UV dose relationship diagram of an alignment film material on the substrate for the photoalignment equipment shown in FIG. 1 compared with a conventional equipment.

FIG. 4 is an orientation-UV dose relationship diagram of the alignment film material on the substrate for the photoalignment equipment 100 shown in FIG. 1 compared with the conventional equipment. Line L3 is a measurement result of the substrate with the alignment film material passing through the photoalignment equipment 100. Line L4 is a measurement result of the substrate with the alignment film material only being exposed to an ultraviolet light. Line L5 is a measurement result of the substrate with the alignment film material being heated and exposed to an ultraviolet light. As shown in FIG. 4, the orientation of the alignment film material passing through the photoalignment equipment 100 is the best. The high temperature ozone molecules provided by the photoalignment equipment 100 can be used to heat the substrate with the alignment film material. Therefore, compared with line L3 and line L4, the orientation of line L3 is better than the orientation of line L4. Moreover, although a heating process is used to the substrate of line L5 to improve the reaction rate, the orientation of line L5 is bad. The high ozone molecules provided by the photoalignment equipment 100 may be used to improve the orientation of the alignment film material. Compared with line L3 and line L5, the orientation of L3 is also better than the orientation of L5.

It is to be noted that the elements and the connection relationships described above will not be repeated in the following description.

Figure 5:
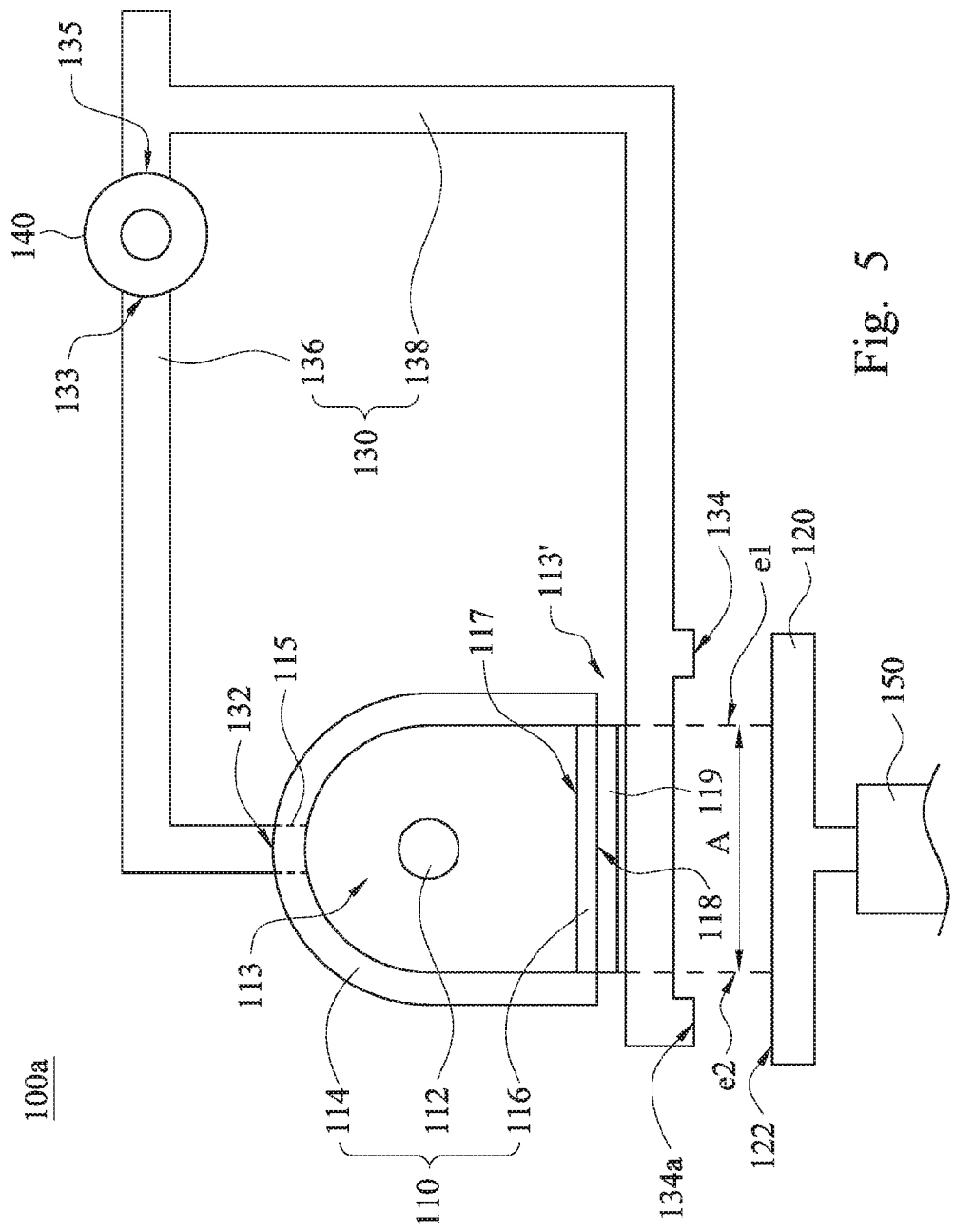
FIG. 5 is a schematic view of a photoalignment equipment according to another embodiment of the present invention.

FIG. 5 is a schematic view of a photoalignment equipment 100a according to another embodiment of the present invention. The photoalignment equipment 100a includes the light emitting device 110, the platform 120, the pipe assembly 130, and the blower 140. The difference between this embodiment and the embodiment shown in FIG. 1 is that the pipe assembly 130 has two second openings 134, 134a. The second opening 134 is at the inlet side e1 of the exposure zone A, and the second opening 134a is at the outlet side e2 of the exposure zone A. The moving device 150 may move the platform 120 into the exposure zone A from the inlet side e1, and may move the platform 120 out of the exposure zone A from the outlet side e2.

In the following description, the operation state of the photoalignment equipment 100a will be described in detail.

Figure 6:
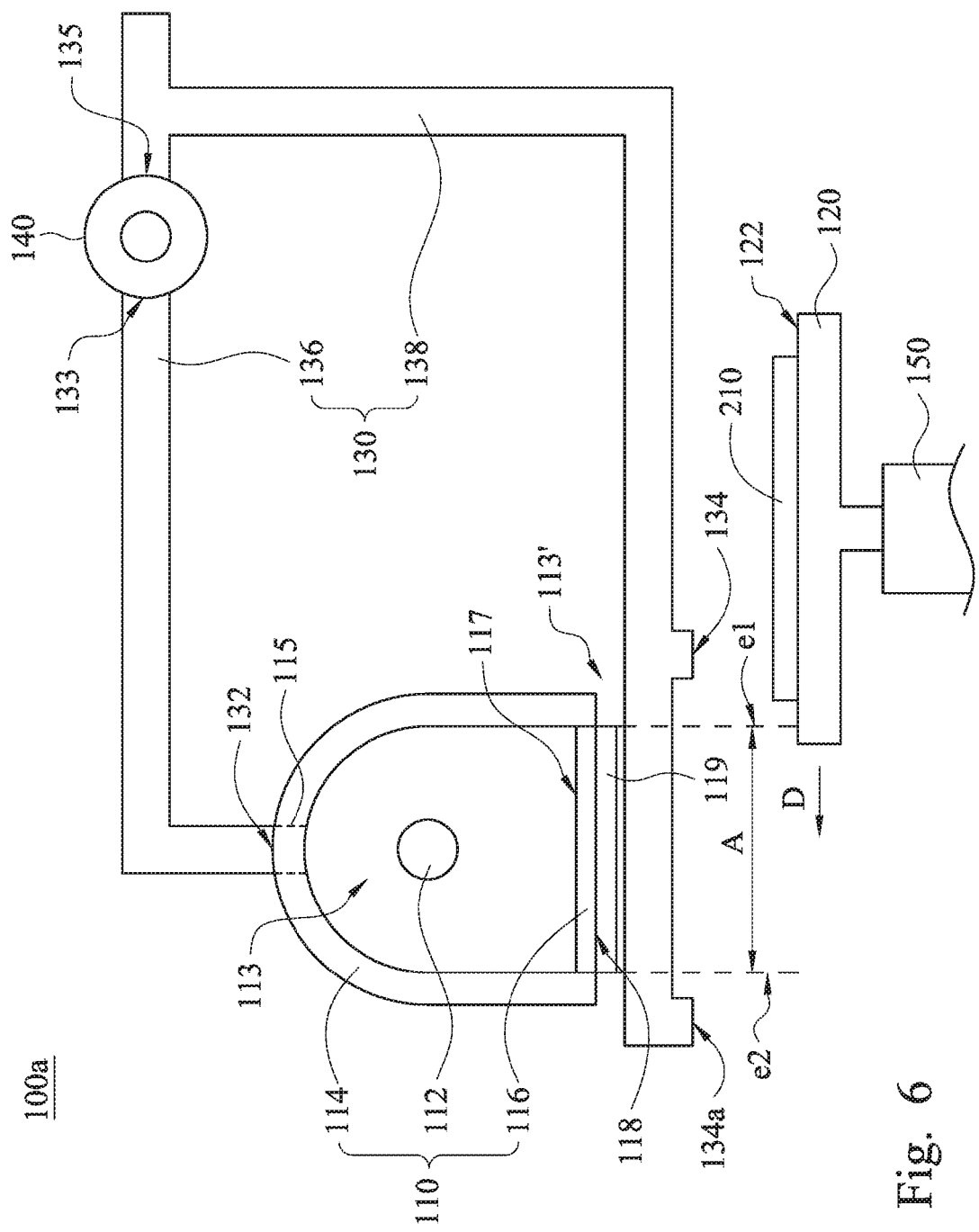
FIG. 6 is a schematic view of the photoalignment equipment shown in FIG. 5 when the photoalignment equipment is in operation and the substrate is not moved into the exposure zone.

FIG. 6 is a schematic view of the photoalignment equipment 100a shown in FIG. 5 when the photoalignment equipment 100a is in operation and the substrate 210 is not moved into the exposure zone A. The blower 140 can draw the ozone molecules in the first accommodating space 113 by the first opening 132 of the pipe assembly 130 and exhaust the ozone molecules from the second openings 134, 134a of the pipe assembly 130. In the state of FIG. 6, the substrate 210 can be in contact with the high temperature ozone molecules exhausted by the second opening 134 of the pipe assembly 130, such that the substrate 210 can be preheated and in a ozone condition before the substrate 210 is exposed to the ultraviolet light L2.

When the moving device 150 moves in the direction D, the substrate 210 is moved into the exposure zone A in the direction D from the inlet side e1 by the platform 120. Before the surface of the substrate 210 is moved into the exposure zone A, the substrate 210 has been passed under the second opening 134 to be preheated and in contact with the ozone molecules.

Figure 7:
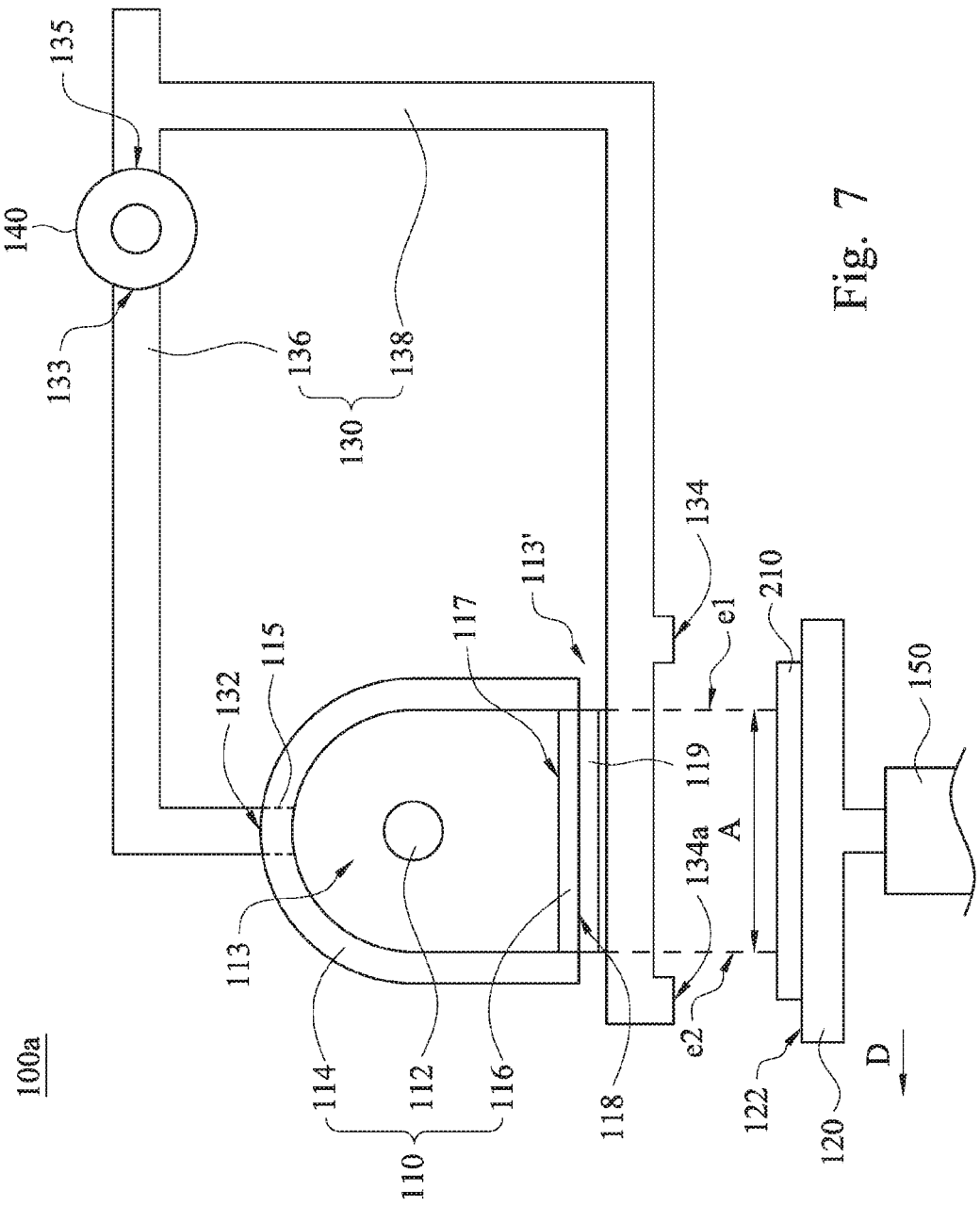
FIG. 7 is a schematic view of the photoalignment equipment shown in FIG. 6 when the photoalignment equipment is in operation and the substrate is in the exposure zone.

FIG. 7 is a schematic view of the photoalignment equipment 100a shown in FIG. 6 when the photoalignment equipment 100a is in operation and the substrate 210 is in the exposure zone A. As shown in FIG. 6 and FIG. 7, when the substrate 210 is moved into the exposure zone A from the inlet side e1 and is exposed to the ultraviolet light L2, the alignment film material on the substrate 210 can be scanned by the ultraviolet light L2 with the second wave band. In this embodiment, the air with the high temperature ozone molecules flows into the exposure zone A from the second opening 134, 134a. As a result, the substrate 210 may be in contact with the high temperature ozone molecules exhausted from the second openings 134, 134a, such that the temperature of the substrate 210 is significantly uniform.

Next, the moving device 150 may move out the platform 120 from the outlet side e2 of the exposure zone A.

Figure 8:
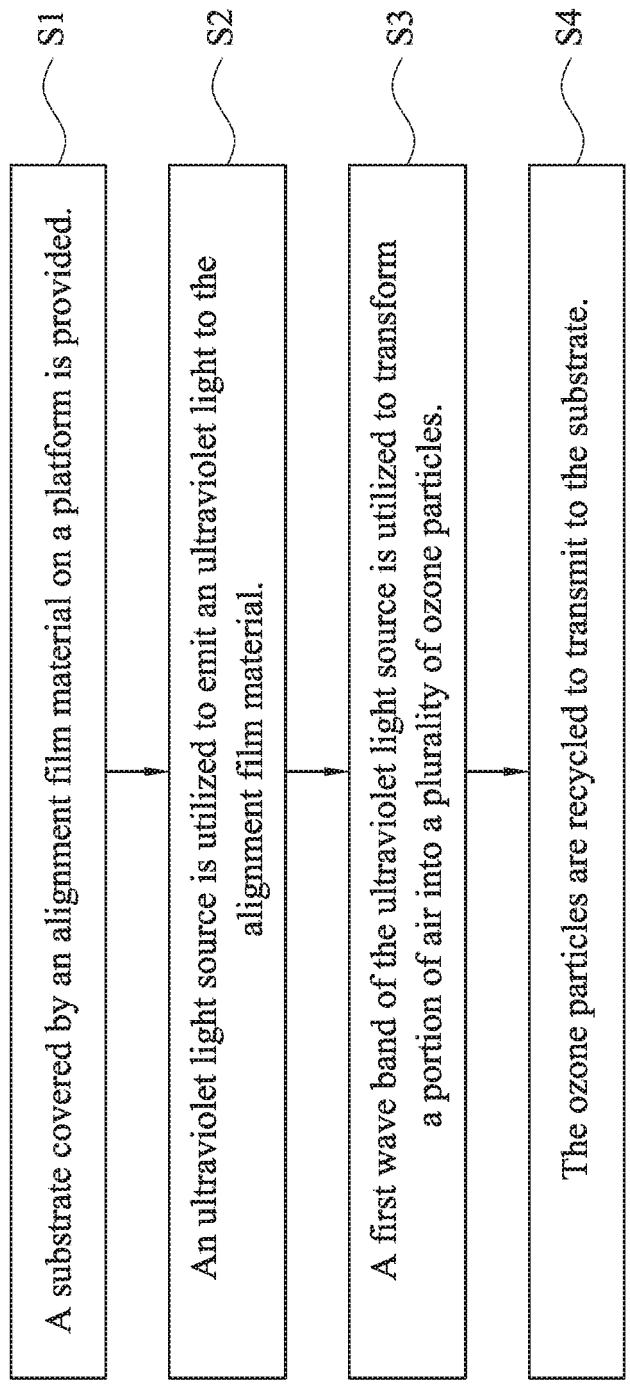
FIG. 8 is a flow chart of a photoalignment method according to an embodiment of the present invention.

FIG. 8 is a flow chart of a photoalignment method according to an embodiment of the present invention. In step S1, a substrate covered by an alignment film material on a platform is provided. The platform has a function of horizontal movement. When the substrate is moved by the platform to a position under an ultraviolet light source, thereafter in step S2, the ultraviolet light source is utilized to emit an ultraviolet light to the alignment film material. The ultraviolet light passes through an optical filter, such that a first wave band cannot pass through the optical filter, while a second wave band can pass through the optical filter. Next in step S3, the first wave band of the ultraviolet light source is utilized to transform a portion of air into a plurality of ozone molecules. Thereafter in step S4, the ozone molecules are recycled to transmit to the substrate. For example, a pipe assembly and a blower may be used to transmit the ozone molecules adjacent to the ultraviolet light source to the substrate. However, the sequential order of the aforesaid steps is not limited in the present invention. For instance, the ultraviolet light source may be switched on, such that the first wave band of the ultraviolet light source transforms a portion of air into the ozone molecules. Next, the ozone molecules are recycled to transmit to the substrate. Thereafter, the ultraviolet light source is utilized to emit light to the alignment film material.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photoalignment method comprising:
   providing a substrate covered by an alignment film material on a platform;
   utilizing an ultraviolet light source to emit an ultraviolet light to the alignment film material, wherein the ultraviolet light source has a first wave band and a second wave band;
   utilizing the first wave band of the ultraviolet light source to transform a portion of air into a plurality of ozone molecules;
   recycling the ozone molecules to transmit to the substrate; and
   utilizing the second wave band of the ultraviolet light source to scan the alignment film material that covers the substrate.

2. The photoalignment method of claim 1, wherein a temperature of the ozone molecules is in a range from 40 to 60° C.

3. The photoalignment method of claim 1, wherein the first wave band is smaller than or equal to 240 nm.

4. The photoalignment method of claim 1, further comprising:
   recycling hot air generated by the ultraviolet light source to transmit to the substrate.

5. The photoalignment method of claim 1, further comprising:
   utilizing an optical filter for the ultraviolet light source, such that the first wave band does not pass through the optical filter, and the ozone molecules are formed by the first wave band and the air adjacent to the ultraviolet light source; while the second wave band passes through the optical filter to emit to the substrate.

* * * * *